(12) United States Patent
Hirata

(10) Patent No.: US 7,449,042 B2
(45) Date of Patent: Nov. 11, 2008

(54) FILTERING MEMBER AND METHOD OF MANUFACTURING THE SAME

(75) Inventor: Yuichi Hirata, Nagoya (JP)

(73) Assignee: Chuo Hatsujo Kabushiki Kaisha (JP)

( * ) Notice: Subject to any disclaimer, the term of this patent is extended or adjusted under 35 U.S.C. 154(b) by 281 days.

(21) Appl. No.: 10/597,815

(22) PCT Filed: Feb. 9, 2005

(86) PCT No.: PCT/JP2005/001969

§ 371 (c)(1),
(2), (4) Date: Aug. 8, 2006

(87) PCT Pub. No.: WO2005/075050

PCT Pub. Date: Aug. 18, 2005

(65) Prior Publication Data

US 2007/0169454 A1    Jul. 26, 2007

(30) Foreign Application Priority Data

Feb. 10, 2004   (JP) .............................. 2004-033790

(51) Int. Cl.
*B01D 39/12* (2006.01)
(52) U.S. Cl. ...................... 55/525; 55/DIG. 5; 280/742
(58) Field of Classification Search ................ 55/385.1, 55/385.3, 498, 525, 526, DIG. 5; 280/728.1, 280/736, 740, 742; 29/896.62
See application file for complete search history.

(56) References Cited

U.S. PATENT DOCUMENTS

| | | | | |
|---|---|---|---|---|
| 5,702,494 A | * | 12/1997 | Tompkins et al. | 55/498 |
| 5,855,635 A | * | 1/1999 | Rice | 55/486 |
| 5,908,481 A | * | 6/1999 | Siddiqui | 55/485 |
| 6,196,581 B1 | * | 3/2001 | Katsuda et al. | 280/736 |
| 6,234,521 B1 | * | 5/2001 | Katsuda et al. | 280/736 |
| 6,926,304 B2 | * | 8/2005 | Miyaji et al. | 280/741 |
| 6,929,284 B1 | * | 8/2005 | Saso et al. | 280/741 |
| 6,945,561 B2 | * | 9/2005 | Nakashima et al. | 280/736 |
| 2003/0057687 A1 | * | 3/2003 | Nakashima et al. | 280/736 |
| 2006/0151978 A1 | * | 7/2006 | Miyaji et al. | 280/736 |

FOREIGN PATENT DOCUMENTS

| | | |
|---|---|---|
| JP | 2001-171472 | 6/2001 |
| JP | 2001-171473 | 6/2001 |
| JP | 2001-301561 | 10/2001 |
| JP | 2001-315611 | 11/2001 |
| JP | 2002-306914 | 10/2002 |

* cited by examiner

*Primary Examiner*—Frank M Lawrence
*Assistant Examiner*—Robert A Clemente
(74) *Attorney, Agent, or Firm*—Akerman Senterfitt

(57) ABSTRACT

A filter (15) has a cylindrical body (15a). The cylindrical body (15a) is formed by laminating a plurality of pattern layers formed into a mesh form by a wire (16) in the radial direction. By repeating the traverse of the wire (16) and the reversal of the traverse direction in one winding end portion (L1) and an other winding end portion (L2), a plurality of turnaround points are set uniformly in the winding end portions (L1, L2). The shortest distance (X) in the circumferential direction between a first turnaround point (B1) of the plurality of turnaround points in the other winding end portion (L2) and a third turnaround point (B3) at which the traverse direction is reversed immediately after being reversed at the first turnaround point (B1) is longer than the shortest distance (Y) in the circumferential direction between the first turnaround point (B1) and a fifth turnaround point (B5) located nearest to the first turnaround point (B1).

7 Claims, 6 Drawing Sheets

FILTERING MEMBER AND METHOD OF MANUFACTURING THE SAME

This application is a 371 National Phase of PCT/JP2005/001969 filed on Feb. 9, 2005, which claims priority to Japanese patent application 2004-033790, filed on Feb. 2, 2004.

TECHNICAL FIELD

The present invention relates to a filtering member including a cylindrical body formed by winding a wire and a method of manufacturing the filtering member.

FIELD OF THE INVENTION

Generally, a vehicle is mounted with an airbag system in which a gas is released into a bag in a short interval to expand the bag as a result of sudden deceleration of the vehicle caused by collision etc. The airbag system has an inflator having a function for releasing the gas in a short interval, and a bag that is expanded by the gas released from the inflator to protect a passenger. The inflator is provided with an igniter for generating heat, a gas generating agent that is burned explosively by the heat of the igniter to generate the gas, and an inflator filter for filtering and cooling the gas generated. As the inflator filter, a wire-wound filter is mainly used (for example, refer to Patent Document 1). This wire-wound filter is formed by weaving a wire, which is a metallic round wire or a special-form wire such as a square wire, into a cylindrical body having meshes.

The wire is usually woven by cross winding. Specifically, a feed guide tool for the wire is reciprocated along the axial direction of a cylindrical jig rotating in one direction while the wire is wound on the outer circumferential surface, by which the wire is cross wound on the jig with a fixed winding angle with respect to the axial direction of the jig. The cross winding means that the wire is wound while a uniform clearance (pitch) is provided between the wires to form meshes.

The following explanation provides more detail. As shown in FIG. 11, a wire 6 is wound on the jig while being fed uniformly from one winding end portion L11 to the other winding end portion L12 in the axial direction of the jig. In FIG. 11, during the time until the wire 6 arrives at the other winding end portion L12 from one winding end portion L11, the jig rotates substantially one and a half turns. At this time, if a position at which the wire 6 in one winding end portion L11 begins to be wound is referred to as the start point A10 in the circumferential direction of the jig, a position at which the wire 6 arrives at the other winding end portion L12, namely a turnaround point B11, corresponds to a position at which the jig has further rotated through a predetermined angle (two degrees in FIG. 11) from the position at which the jig has rotated through 180 degrees from the start point A10.

When the wire 6 arrives at the turnaround point B11, the feed direction (traverse direction) of the wire 6 is reversed. Successively, the wire 6 is wound in the same way as described above from the other winding end portion L12 to one winding end portion L11, and arrives at a turnaround point A12 of one winding end portion L11. This turnaround point A12 corresponds to a position at which the jig has further rotated through a predetermined angle (two degrees in FIG. 11) from the position at which the jig has rotated through 180 degrees from the turnaround point B11, namely a position at which the jig has rotated through four degrees from the start point A10. A distance between the start point A10 and the turnaround point A12 in the circumferential direction of the jig is called a shift amount.

Due to the reversal of the traverse direction, the wires 6 wound on the jig intersect each other. Next, as indicated by a broken line in FIG. 11, the wire 6 is further wound in the same way as described above. By repeating the above-described operation, a first pattern layer having uniform meshes is formed over the whole of the outer circumferential surface of the jig. By the repeated winding of the wire 6 accompanied by the reversal of the traverse direction, a plurality of pattern layers are formed. As a result, the pattern layers are laminated to form a cylindrical body.

At a location surrounded by a dashed line in FIG. 11, as shown in FIG. 12(a), a wire 6b passes over a wire 6a located on the inside of the wire-wound filter. In the vicinity of the intersection location of the wire 6a and the wire 6b, a wire 6c passes over the wire 6b. At this time, since tension is applied to the wire 6b in the circumferential direction of the jig, namely in the right and left direction in FIG. 12(a), at the time of winding, the wire 6c is raised by the wire 6b and floats slightly to the outside of the wire-wound filter. As a result, the thickness of the intersection location of the wire 6b and the wire 6c, which is equal to two times the thickness t of the wire 6 in an ideal state as shown in FIG. 12(b), is actually a little larger than two times the thickness t of the wire 6 because the wire 6c is raised by the wire 6b through a height α.

As shown by dashed lines 1 in FIG. 13, the locations at which the wire 6 floats to the outside of the wire-wound filter substantially concentrate on predetermined reference lines O and P extending in directions perpendicular to the axis of the wire-wound filter. The height α is accumulated as a pattern layer 8 is laminated. Therefore, as the number of laminations of the pattern layer 8 increases, the float of the wire 6 increases. On the other hand, at locations other than the reference lines O and P, for example, in an intermediate portion between the reference line O and the reference line P or in the vicinity of the winding end portions L1 and L2, the wire 6 does not float. As a result, on the outer circumferential surface of the wire-wound filter, the float of the wire 6 remarkably appears, and hence undulation is formed.

In order to ensure the performance of inflator, it is necessary to form a gap larger than a predetermined size between an inflator case and the filter. However, when the wire-wound filter is used, the gap between the case and the wire-wound filter is decreased by the above-mentioned undulation, which presents a problem of decreased inflator performance. The occurrence of undulation can be restrained by adjustment such that the traverse amount of the wire 6 is decreased, the shift amount is increased, or the number of turns of the wire 6 is decreased; however, such adjustment decreases the performance of the wire-wound filter. Therefore, it is difficult to restrain the occurrence of undulation while the performance of the wire-wound filter is ensured.

[Patent Document 1] Japanese Laid-Open Patent Publication No. 2002-306914

SUMMARY OF THE INVENTION

An object of the present invention is to provide a filtering member capable of preventing undulation from occurring on the outer circumferential surface thereof, and a method of manufacturing the filtering member.

In one aspect of the present invention, there is provided a filtering member including a cylindrical body formed by winding a wire there for filtering and cooling a gas by allowing the gas to pass through from the inside to the outside in the radial direction. The cylindrical body is formed by laminating a plurality of pattern layers in the radial direction. The pattern layer is formed into a mesh form by traversing the wire between one winding end portion and an other winding end portion in the axial direction of the cylindrical body while the traverse direction of the wire is reversed in one winding end portion and the other winding end portion. In the other winding end portion, a plurality of reversal positions are set to reverse the traverse direction of the wire, and the shortest distance in the circumferential direction between a first reversal position of the plurality of reversal positions and a second reversal position at which the traverse direction is reversed immediately after being reversed at the first reversal position is longer than the shortest distance in the circumferential direction between the first reversal position and a third reversal position located nearest to the first reversal position.

In another aspect of the present invention, there is provided a method of manufacturing a filtering member including a cylindrical body formed by winding a wire. The method includes a step of forming a pattern layer of a mesh form on the outer circumferential surface of a shaft member by winding the wire on the outer circumferential surface of the shaft member and laminating the pattern layer in plural numbers in the radial direction of the shaft member. In this step, the pattern layer is formed by traversing the wire in one winding end portion and an other winding end portion in the axial direction of the shaft member while the traverse direction of the wire is reversed between one winding end portion and the other winding end portion, and also in the other winding end portion, a plurality of reversal positions are set to reverse the traverse direction of the wire. Further, in this step, the wire is wound so that the shortest distance in the circumferential direction between a first reversal position of the plurality of reversal positions and a second reversal position at which the traverse direction is reversed immediately after being reversed at the first reversal position is longer than the shortest distance in the circumferential direction between the first reversal position and a third reversal position located nearest to the first reversal position.

DESCRIPTION OF THE PREFERRED EMBODIMENTS

One embodiment of a filtering member mounted in an inflator of an airbag system and a method of manufacturing the filtering member which embodies the present invention will be described with reference to the accompanying drawings.

Figure 1:
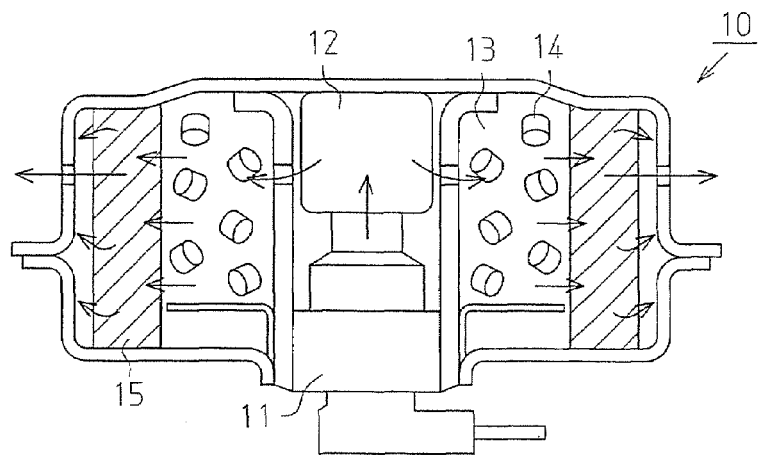
FIG. 1 is a cross-sectional view showing an inflator in accordance with an embodiment.

As shown in FIG. 1, in the central portion of an inflator 10 of an airbag system (not shown) in accordance with this embodiment, an igniter 11 for accomplishing ignition based on an operation signal sent from a sensor (not shown) and a combustible combustion improver 12 are mounted. The combustion improver 12 is ignited by the igniter 11 to help the generation of heat. In the outer peripheral portion of the igniter 11 and the combustion improver 12, a chamber 13 is provided into which the heat generated by the igniter 11 and the combustion improver 12 flows. In the chamber 13, a gas generating agent 14 is contained. The gas generating agent is burned explosively by the heat generated by the operations of the igniter 11 and the combustion improver 12 to generate a large amount of gas. The gas generated is supplied into a bag (not shown) mounted on the airbag system together with the inflator 10.

In the inflator 10, a filter 15 serving as a filtering member is arranged so as to surround the chamber 13. The filter 15 has a cooling function of cooling the high-temperature gas generated from the gas generating agent 14 and a filtering function of filtering residues contained in the gas. In FIG. 1, the direction in which the generated gas flows is indicated by the arrows.

Figure 2A:
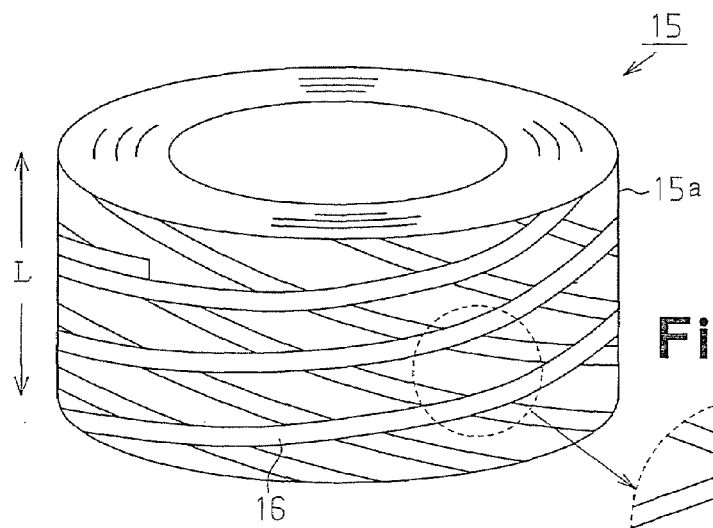
FIG. 2(a) is a perspective view of a filter.
Figure 2B:
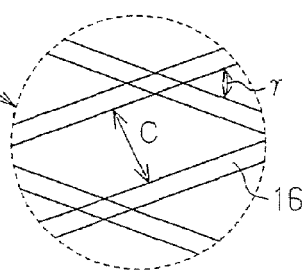
FIG. 2(b) is a partially enlarged view of the filter.

As shown in FIGS. 2(a) and 2(b), the filter 15 is manufactured by winding a wire 16 such as a metallic square wire or round wire on a cylindrical bobbin 19 (refer to FIGS. 3 to 7) serving as a shaft member and then by removing the bobbin 19, a cylindrical body 15a is formed having meshes. Through the clearances of the meshes of the cylindrical body 15a, the high-temperature gas generated from the gas generating agent 14 passes. At this time, the gas is cooled, and also the residues contained in the gas are filtered. The wire-wound cylindrical body 15a in accordance with the present invention uses a wire rod composed mainly of iron as the wire 16, and is formed into a cylindrical shape having an outside diameter of 60 mm and the inside diameter of 50 mm by winding the wire 16 on the outer circumferential surface of the bobbin 19 in 500 turns.

As shown in FIGS. 2(a) and 2(b), the interval between wires 16 at the time of winding is referred to as the pitch C, the angle at which the crossing wires 16 intersect each other is referred to as the intersection angle γ, and the winding width of the wire 16 in the axial direction of the cylindrical body 15a is referred to as the winding width L.

Next, a method of manufacturing the filter 15 is explained in detail with reference to FIGS. 3 to 7.

Figure 3:
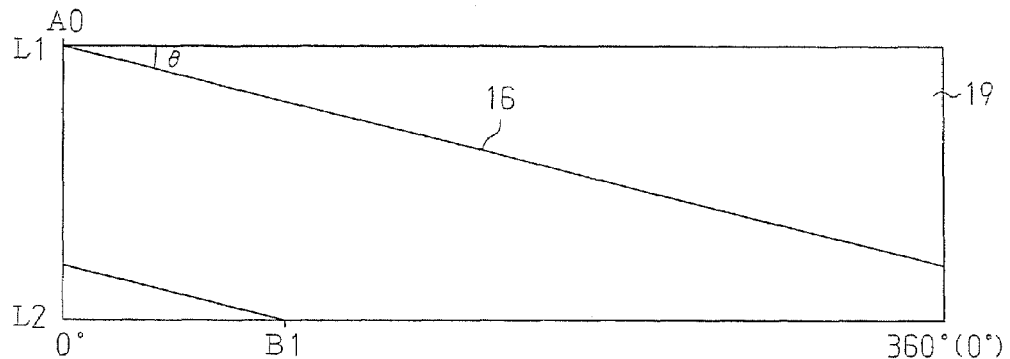
FIG. 3 is a view for illustrating a method of winding a wire.

When the cylindrical body 15a of the filter 15 is manufactured, first, one wire 16 is fed from a feed guide tool (not shown), and then the start end of the wire 16 is fixed in one winding end portion L1 in the axial direction of the bobbin 19. Next, the feed guide tool is moved from one winding end portion L1 to the other winding end portion L2 at a constant speed along the axial direction of the bobbin 19 rotating in one direction while the wire 16 is fed from the feed guide tool. Thereby, as shown in FIG. 3, the wire 16 is wound on the outer periphery of the bobbin 19 so as to be inclined at a predetermined winding angle θ with respect to the circumferential direction of the bobbin 19. Hereunder, "the axial movement of the wire 16" caused by the movement of the feed guide tool in the axial direction of the bobbin 19 is referred to as "the feed of the wire 16" or "the traverse of the wire 16". Also, a position at which the wire 16 begins to be wound in one winding end portion L1 is denoted as a start point A0.

Figure 4:
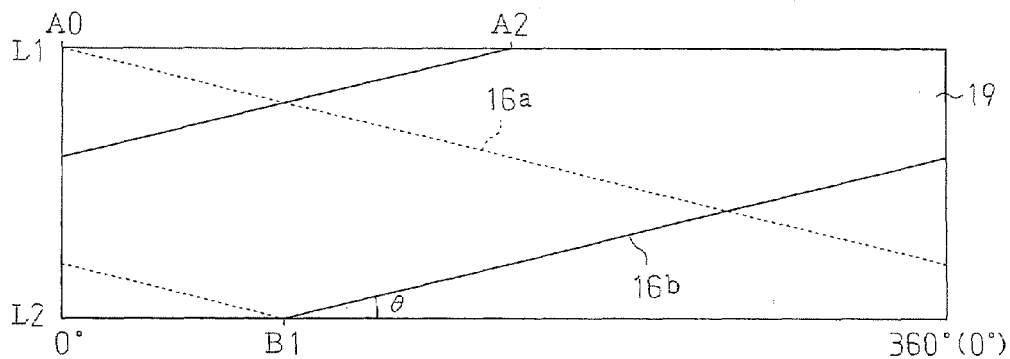
FIG. 4 is a view for illustrating a method of winding a wire.

A position at which the wire 16 arrives at the other winding end portion L2 in the circumferential direction of the bobbin 19, namely a first turnaround point B1, corresponds to a position at which the bobbin 19 has further rotated through a predetermined angle (one degree in this embodiment) from the position at which the bobbin 19 has rotated through 90 degrees from the start point A0. In this embodiment, during the time until the wire 16 arrives at the other winding end portion L2 from the one winding end portion L1 and arrives at one winding end portion L1 from the other winding end portion L2, the bobbin 19 rotates substantially one and a quarter turns every time. As shown in FIG. 4, when the wire 16 arrives at the first turnaround point B1, the feed direction (traverse direction) of the wire 16 fed by the feed guide tool is reversed. Therefore, the first turnaround point B1 is a reversal position at which the traverse direction of the wire 16 is reversed.

Successively, the wire 16 is wound in the same way as described above from the other winding end portion L2 to one winding end portion L1. At this time, a position at which the wire 16 arrives at one winding end portion L1, namely a second turnaround point A2, corresponds to a position at which the bobbin 19 has further rotated through a predetermined angle (one degree in this embodiment) from the position at which the bobbin 19 has rotated through 90 degrees from the first turnaround point B1. The second turnaround point A2 corresponds to a position at which the bobbin 19 has rotated through 182 degrees from the start point A0, and the first turnaround point B1 is a first reversal position. In FIG. 4, the wire 16 from the start point A0 to the first turnaround point B1, namely a first wire 16a, is shown by a broken line, and the wire 16 from the first turnaround point B1 to the second turnaround point A2, namely a second wire 16b, is shown by a solid line.

Figure 7:
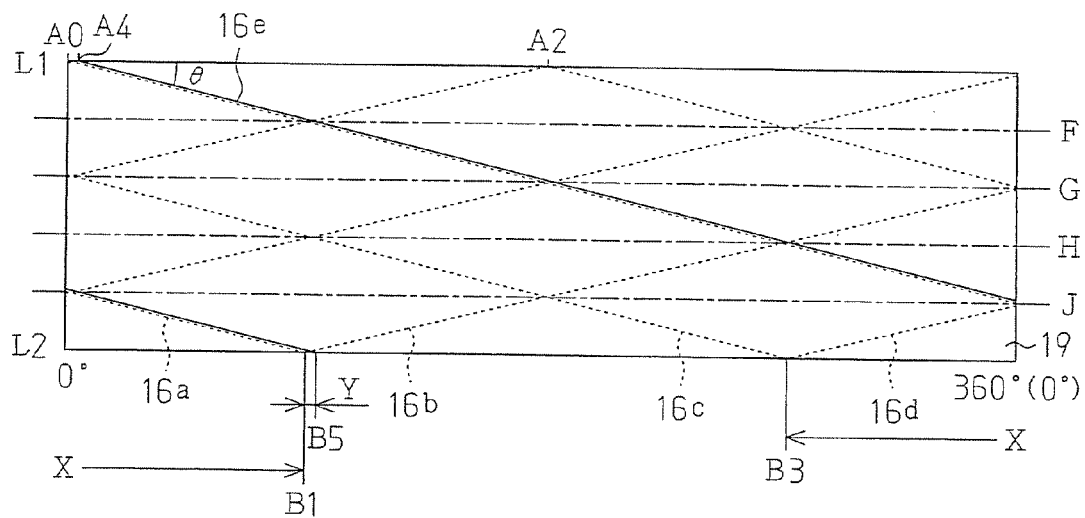
FIG. 7 is a view for illustrating a method of winding a wire.

After the wire 16 has been wound on the bobbin 19 in this manner, the first wire 16a and the second wire 16b intersect each other on a reference line F and a reference line H extending along the circumferential direction of the bobbin 19, namely, extending in the direction perpendicular to the axis of the bobbin 19 as shown in FIG. 7. As shown in FIG. 7, the distance between one winding end portion L1 and the other winding end portion L2 is divided into five equal parts by four reference lines F, G, H and J extending in the direction perpendicular to the axis of the bobbin 19. The reference lines F, G, H and J are arranged in the named order from one winding end portion L1 to the other winding end portion L2.

Figure 5:
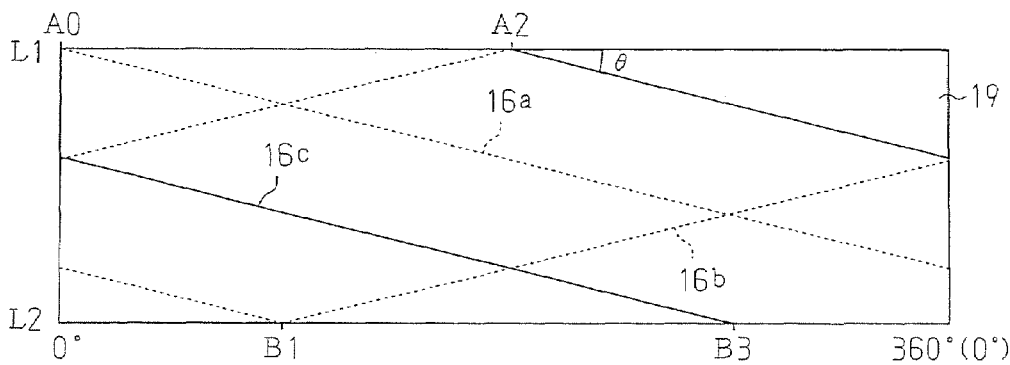
FIG. 5 is a view for illustrating a method of winding a wire.

As shown in FIG. 5, when the wire 16 arrives at the second turnaround point A2, the traverse direction of the wire 16 is reversed. Successively, the wire 16 is wound in the same way as described above from one winding end portion L1 to the other winding end portion L2. At this time, a position at which the wire 16 arrives at the other winding end portion L2, namely a third turnaround point B3, corresponds to a position at which the bobbin 19 has further rotated through a predetermined angle (one degree in this embodiment) from the position at which the bobbin 19 has rotated through 90 degrees from the second turnaround point A2. That is to say, the third turnaround point B3 corresponds to a position at which the bobbin 19 has rotated through 273 degrees from the start point A0. In FIG. 5, the first wire 16a and the second wire 16b are shown by a broken line, and the wire 16 from the second turnaround point A2 to the third turnaround point B3, namely a third wire 16c, is shown by a solid line. After the wire 16 has been wound on the bobbin 19 in this manner, the second wire 16b and the third wire 16c intersect each other on the reference line G and the reference line J as shown in FIG. 7.

Figure 6:
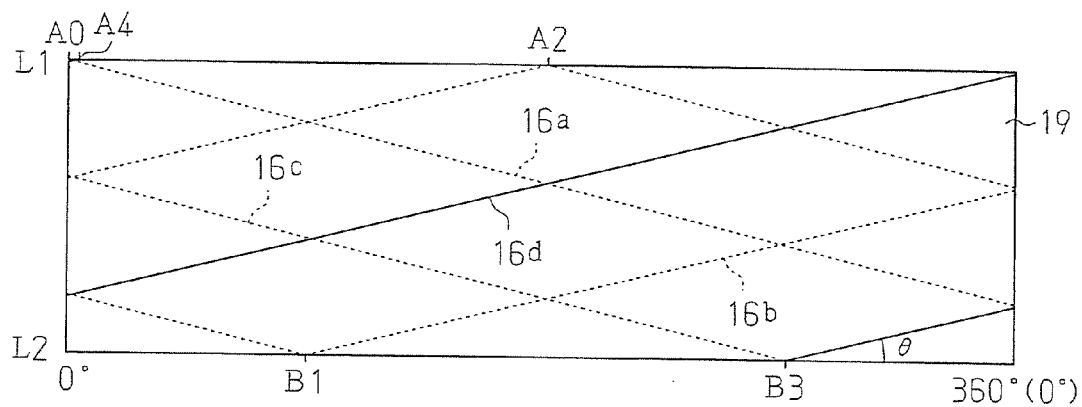
FIG. 6 is a view for illustrating a method of winding a wire.

Then, as shown in FIG. 6, when the wire 16 arrives at the third turnaround point B3, the traverse direction of the wire 16 is reversed. Successively, the wire 16 is wound in the same way as described above from the other winding end portion L2 to one winding end portion L1. At this time, a position at which the wire 16 arrives at one winding end portion L1, namely a fourth turnaround point A4, corresponds to a position at which the bobbin 19 has further rotated through a predetermined angle (one degree in this embodiment) from the position at which the bobbin 19 has rotated through 90 degrees from the third turnaround point B3. That is to say, the fourth turnaround point A4 corresponds to a position at which the bobbin 19 has rotated through 364 degrees (that is, 4 degrees) from the start point A0, and the third turnaround point B3 is a second reversal position. In FIG. 6, the first wire 16a, the second wire 16b, and the third wire 16c are shown by a broken line, and the wire 16 from the third turnaround point B3 to the fourth turnaround point A4, namely a fourth wire 16d, is shown by a solid line. After the wire 16 has been wound on the bobbin 19 in this manner, the fourth wire 16d and the first wire 16a intersect each other on the reference line G and the reference line J, and the fourth wire 16d and the third wire 16c intersect each other on the reference line F and the reference line H as shown in FIG. 7.

Then, as shown in FIG. 7, when the wire 16 arrives at the fourth turnaround point A4, the traverse direction of the wire 16 is reversed. Successively, the wire 16 is wound in the same way as described above from one winding end portion L1 to the other winding end portion L2. At this time, a position at which the wire 16 arrives at the other winding end portion L2, namely a fifth turnaround point B5, corresponds to a position at which the bobbin 19 has further rotated through a predetermined angle (one degree in this embodiment) from the position at which the bobbin 19 has rotated through 90 degrees from the fourth turnaround point A4. That is to say, the fifth turnaround point B5 corresponds to a position at which the bobbin 19 has rotated through 4 degrees from the first turnaround point B1, and the fifth turnaround point B5 is a third reversal position. In FIG. 7, the first wire 16a, the second wire 16b, the third wire 16c, and the fourth wire 16d are shown by a broken line, and the wire 16 from the fourth turnaround point A4 to the fifth turnaround point B5, namely a fifth wire 16e, is shown by a solid line.

Figure 8A:
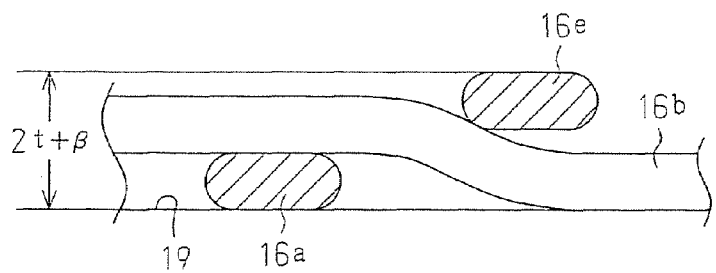
FIGS. 8(a) to 8(c) are cross-sectional views showing a part of a pattern layer.

At this time, on the reference line F, the fifth wire 16e extending in parallel with the first wire 16a passes over the second wire 16b in the vicinity of the location at which the second wire 16b passes over the first wire 16a. Therefore, as shown in FIG. 8(a), since tension is applied to the second wire 16b in the circumferential direction of the bobbin 19, namely in the right and left direction in FIG. 8(a), the fifth wire 16e over the second wire 16b is raised by the second wire 16b and floats through a height β to the outside in the radial direction of the bobbin 19. As a result, the thickness of the intersection location of the second wire 16b and the fifth wire 16e becomes larger than two times the thickness t of the wire 16.

Similarly, on the reference line G as well, the fifth wire 16e extending in parallel with the first wire 16a passes over the fourth wire 16d in the vicinity of the location at which the fourth wire 16d passes over the first wire 16a. At this time, since tension is applied to the fourth wire 16d in the circumferential direction of the bobbin 19, the fifth wire 16e over the fourth wire 16d is raised by the fourth wire 16d and floats through a height β to the outside in the radial direction of the bobbin 19. As a result, the thickness of the intersection location of the fourth wire 16d and the fifth wire 16e becomes larger than two times the thickness t of the wire 16.

Similarly, on the reference line H as well, the fifth wire 16e is raised by the second wire 16b at the intersection location of the second wire 16b and the fifth wire 16e, and floats through a height β to the outside in the radial direction of the bobbin 19. As a result, the thickness of the intersection location of the second wire 16b and the fifth wire 16e becomes larger than two times the thickness t of the wire 16. Further, similarly, on the reference line J as well, the fifth wire 16e is raised by the fourth wire 16d at the intersection location of the fourth wire 16d and the fifth wire 16e, and floats through a height β to the outside in the radial direction of the bobbin 19. As a result, the thickness of the intersection location of the fourth wire 16d and the fifth wire 16e becomes larger than two times the thickness t of the wire 16.

Subsequently, by repeating such a traverse of the wire 16 and reversal of the traverse direction in the winding end portions L1 and L2, a plurality of turnaround points are provided uniformly in the winding end portions L1 and L2, and a first pattern layer having uniform meshes is formed over the whole of the outer circumferential surface of the bobbin 19. The above-mentioned turnaround points separate by a predetermined angle (four degrees in this embodiment) in the circumferential direction of the bobbin 19. After the first pattern layer has been formed, by further repeating the traverse of the wire 16 and the reversal of the traverse direction in the winding end portions L1 and L2, a second and subsequent pattern layers are laminated in succession on the first pattern layer, by which the cylindrical body 15a is formed. That is to say, pattern layers are laminated in succession in the radial direction of the bobbin 19, by which the cylindrical body 15a is formed. When the winding of the wire 16 is finished, the tail end (not shown) of the wire 16 is fixed on the pattern layer, for example, by welding. Next, by pulling the bobbin 19 out of the cylindrical body 15a, a hollow cylindrical body 15a can be obtained. The start end of the wire 16 that is fixed in one winding end portion L1 when the wire 16 begins to be wound on the bobbin 19 is cut from the wire 16 that is fed from the feed guide tool when the winding of the wire is finished, and is fixed on the pattern layer, for example, by welding. Thereafter, heat treatment such as sintering is carried out to join the contact portion of the crossing wires 16, by which the filter 15 is manufactured.

The thickness of each pattern layer of the filter 15 thus manufactured is larger than a multiple of the thickness t of the wire 16 on the reference lines F, G, H and J. On the other hand, the thickness of pattern layer at locations other than the reference lines F, G, H and J is equal to a multiple of the thickness t of the wire 16. That is to say, the thickness of the pattern layer at the locations on the reference lines F, G, H and J is larger than that at the other locations. This multiple corresponds to the number of laminations of the pattern layer.

Hereunder, the reason why the thickness of the pattern layer at the locations on the reference lines F, G, H and J is larger than that at the other locations is described in detail.

Figure 8B:
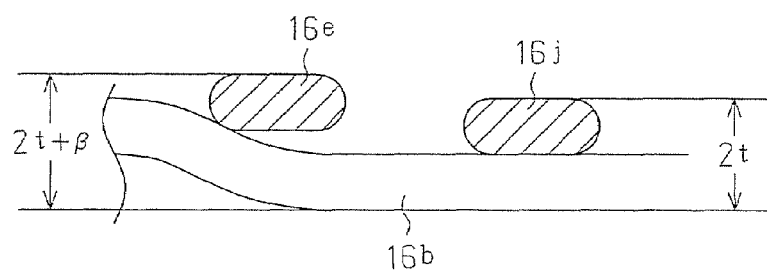
Figure 8C:
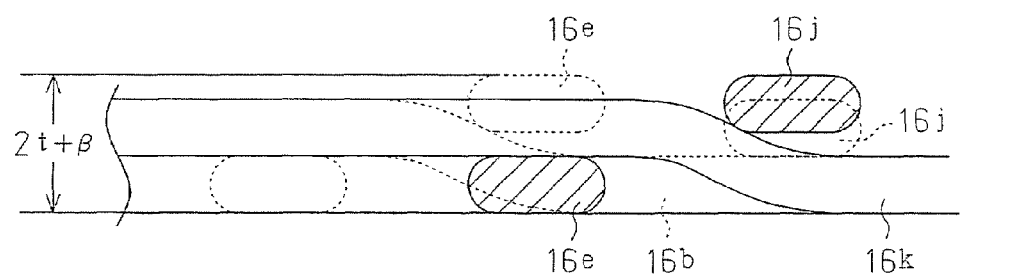

For example, of the wires 16 extending in parallel with the fifth wire 16e, a wire 16 that is to be wound after the fifth wire 16e has been wound, namely a sixth wire 16j, is not raised by the second wire 16b and does not float even if it intersects the second wire 16b as shown in FIG. 8(b). That is to say, the second wire 16b is pushed toward the bobbin 19 by the fifth wire 16e, so that the sixth wire 16j is not raised by the second wire 16b. As a result, the thickness of the intersection location of the second wire 16b and the sixth wire 16j is equal to two times the thickness t of the wire 16. On the other hand, as shown in FIG. 8(c), of the wires 16 extending in parallel with the second wire 16b, a wire 16 that is to be wound after the second wire 16b has been wound, namely a seventh wire 16k, passes under the sixth wire 16j after passing over the fifth wire 16e when it intersects the sixth wire 16j. Therefore, the sixth wire 16j is raised from the bobbin 19 toward the outside by the seventh wire 16k.

Figure 9:
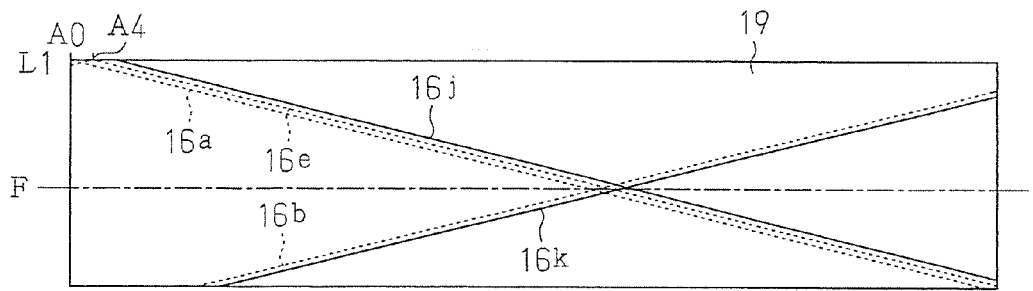
FIG. 9 is a view showing an intersection state of wires.

As shown in FIG. 9, the sixth wire 16j is located on a path on which the fifth wire 16e is moved in parallel along the axial direction of the bobbin 19, and the seventh wire 16k is located on a path on which the second wire 16b is moved in parallel along the axial direction of the bobbin 19. Therefore, the intersection position of the sixth wire 16j and seventh wire 16k is located on the reference line F, and the intersection position of the sixth wire 16j and the second wire 16b is located on the one winding end portion L1 side of the reference line F. As a result, the locations at which the wire 16 floats excessively concentrate on the reference line F. The same phenomenon takes place even when the wires 16 intersect each other on other reference lines G, H and J, so that the thickness of pattern layer is larger than a multiple of the thickness t of the wire 16 on the reference lines F, G, H and J.

The number of reference lines on which the locations at which the wire 16 floats concentrate depends on the distance in the circumferential direction of the cylindrical body 15a between the turnaround point at which the traverse direction of the wire 16 is reversed in the winding end portions L1 and L2 and the turnaround point at which the traverse direction of the wire 16 is reversed again in the winding end portions L1 and L2. That is to say, in FIG. 7, the number of reference lines depends, for example, on the distance between the first turnaround point B1 and the third turnaround point B3 in the circumferential direction of the bobbin 19. Thereupon, in the other winding end portion L2, the shortest distance X in the circumferential direction between the first turnaround point B1 and the third turnaround point B3 is set so as to be longer than the shortest distance Y in the circumferential direction between the first turnaround point B1 and the fifth turnaround point B5 located nearest to the first turnaround point B1.

As a result, for the filter 15 of this embodiment, the number of reference lines increases to four as compared with the conventional filter having two reference lines. The reference lines F, G, H and J are arranged at equal intervals along the winding width L. Therefore, the pattern layers are laminated so as to have a substantially uniform thickness over the whole of the winding width L, and the thickness of the filter 15 is substantially equal in the axial direction thereof.

As described above in detail, this embodiment has the features described below.

For the filter 15 in accordance with this embodiment, the number of reference lines can be increased as compared with the conventional filter by setting the shortest distance X to be longer than the shortest distance Y. The locations at which the wire 16 is raised are distributed uniformly on the reference line. Therefore, for the filter 15 in accordance with this embodiment, the pattern layers can be laminated so as to have a substantially uniform thickness over the whole of the winding width L as compared with the conventional filter, so that the float of the wire 16 can be restrained from appearing on the outer circumferential surface, and hence the occurrence of undulation on the outer circumferential surface can be restrained. Further, for the filter 15 in accordance with this embodiment, by increasing the number of reference lines, the occurrence of undulation can be restrained with the winding width L, the number of turns of the wire 16, the pitch C, the intersection angle γ, etc. scarcely changed, namely with the filtering performance of the filter 15 scarcely changed.

The above-described embodiment may be modified in the following ways.

The wire 16 may be wound while the bobbin 19 is reciprocated in the axial direction thereof so that the wire 16 has a predetermined winding angle with respect to the axial direction of the bobbin 19.

The material and size of the filter 15 may be changed appropriately according to the shape and size of the inflator 10 mounted. Also, the material of the wire 16 may be changed arbitrarily, for example, to mild steel, stainless steel, nickel alloy, or copper alloy.

The length of the wire 16 wound before arriving at the other winding end portion L2 from one winding end portion L1 and at one winding end portion L1 from the other winding end portion L2 may be changed arbitrarily so as to be, for example, one and ¾ turns.

Figure 10:
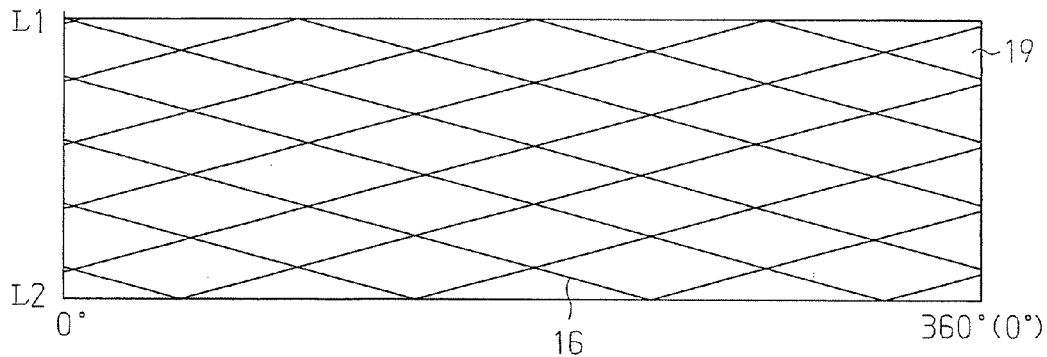
FIG. 10 is a view for illustrating a method of winding a wire in accordance with a modified embodiment.
Figure 11:
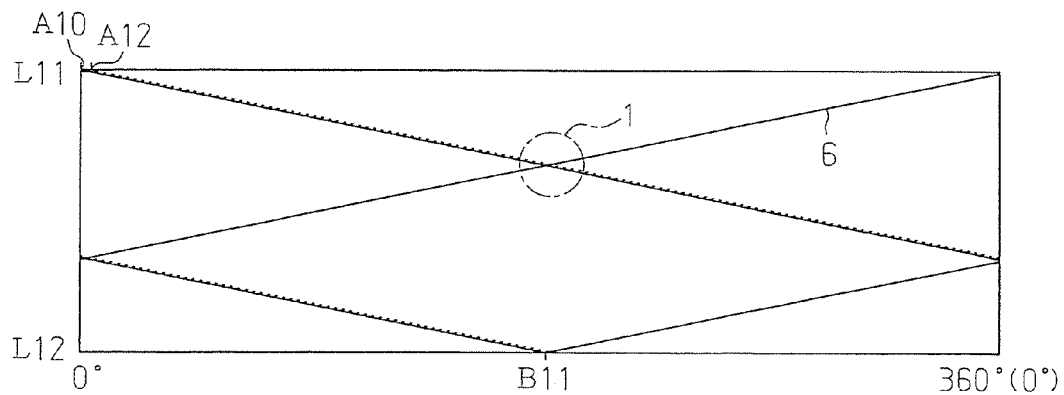
FIG. 11 is a view for illustrating a method of winding a wire in accordance with a prior art example.
Figure 12A:
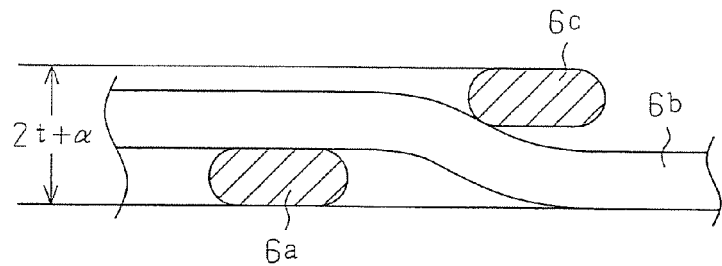
FIGS. 12(a) and 12(b) are cross-sectional views for illustrating the floating of a wire.
Figure 12B:
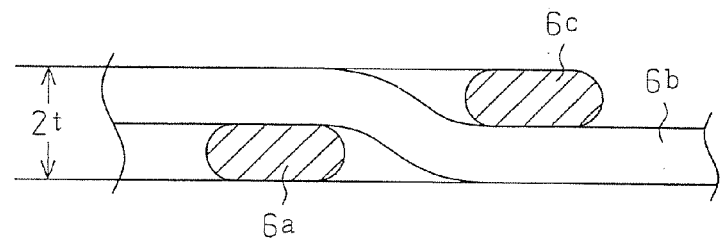
Figure 13:
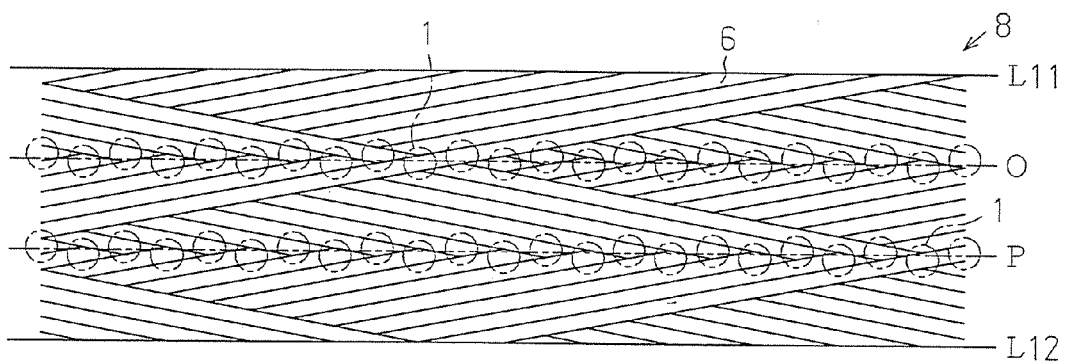
FIG. 13 is a schematic view showing a pattern layer.

Regarding the rotation angle of the bobbin 19, the interval at which the traverse direction of the wire 16 is reversed may be changed arbitrarily. For example, as shown in FIG. 10, the interval at which the traverse direction of the wire 16 is reversed may be shorter than that of the above-described embodiment. The interval at which the traverse direction of the wire 16 is reversed is determined considering, for example, the number of turns of the wire 16, the pitch C, and the traverse amount.

The start end and the tail end of the wire 16 may be fixed on the pattern layer, for example, by swaging, bonding, or welding. Also, when the wire 16 is wound, the start end of the wire 16 may be fixed on the pattern layer by winding the wire 16 over the start end of the wire 16. In addition, the tail end of the wire 16 may be fixed on the pattern layer by holding the tail end of the wire 16 between the wires 16 forming the pattern layer.

After the traverse direction of the wire 16 has been reversed at the third turnaround point B3 in the other winding end portion L2, the traverse direction of the wire 16 may be reversed at the fifth turnaround point B5 after being further reversed one or more times. At this time, the shortest distance in the circumferential direction between a turnaround point set as the third turnaround point B3 and subsequently the first turnaround point B1 is set so as to be longer than the shortest distance Y. In this case as well, the number of reference lines can be increased as compared with the conventional filter, so that the float of the wire 16 can be restrained from appearing on the outer circumferential surface, and hence the occurrence of undulation on the outer circumferential surface can be restrained.

Instead of setting the shortest distance X to be longer than the shortest distance Y, the shortest distance in the circumferential direction between the second turnaround point A2 and the fourth turnaround point A4 in one winding end portion L1 may be set so as to be longer than the shortest distance in the circumferential direction between the second turnaround point A2 and the turnaround point located nearest to the second turnaround point A2. In this case as well, the number of reference lines can be increased as compared with the conventional filter, so that the float of the wire 16 can be restrained from appearing on the outer circumferential surface, and hence the occurrence of undulation on the outer circumferential surface can be restrained.

The invention claimed is:

1. A filtering member comprising a cylindrical body formed by winding a wire there for filtering and cooling a gas by allowing the gas to pass through from an inside to an outside in a radial direction, wherein the cylindrical body is formed by laminating a plurality of pattern layers in the radial direction, the pattern layers being formed into a mesh form by traversing the wire between one winding end portion and an otherwinding end portion in an axial direction of the cylindrical body while a traverse direction of the wire is reversed in one winding end portion and the other winding end portion, in the other winding end portion, a plurality of reversal positions are set to reverse the traverse direction of the wire, and a shortest distance in a circumferential direction between a first reversal position of the plurality of reversal positions and a second reversal position at which the traverse direction is reversed immediately after being reversed at the first reversal position is longer than a shortest distance in the circumferential direction between the first reversal position and a third reversal position located nearest to the first reversal position.

2. The filtering member according to claim 1, wherein the traverse direction is reversed at the second reversal position after being reversed at the first reversal position, and is further reversed at the third reversal position.

3. The filtering member according to claim 1, the traverse direction is reversed one or more times in the other winding end portion after being reversed at the first reversal position, and is further reversed at the third reversal position, and a shortest distance in the circumferential direction between the first reversal position and a reversal position that is set in the other winding end portion during the time until the traverse direction is reversed at the third reversal position after being reversed at the first reversal position is longer than the shortest distance in the circumferential direction between the first reversal position and the third reversal position.

4. A method of manufacturing a filtering member including a cylindrical body formed by winding a wire, the method comprising: forming a pattern layer of a mesh form on an outer circumferential surface of a shaft member by winding the wire on the outer circumferential surface of the shaft member and laminating the pattern layer in plural numbers in a radial direction of the shaft member wherein, the pattern layer is formed by traversing an wire between one winding end portion and the other winding end portion in an axial direction of the shaft member while a traverse direction of the wire is reversed in one winding end portion and the other winding end portion, in the other winding end portion, a plurality of reversal positions are set to reverse the traverse direction of the wire; and the wire is wound so that a shortest distance in a circumferential direction between a first reversal position of the plurality of reversal positions and a second reversal position at which the traverse direction is reversed immediately after being reversed at the first reversal position is longer than a shortest distance in the circumferential direction between the first reversal position and a third reversal position located nearest to the first reversal position.

5. The method of manufacturing a filtering member according to claim 4, wherein the traverse direction is reversed at the second reversal position after being reversed at the first reversal position, and is further reversed at the third reversal position.

6. The method of manufacturing a filtering member according to claim wherein the wire is wound so that the traverse direction is reversed one or more times in the other winding end portion after being reversed at the first reversal position, and is further reversed at the third reversal position; and a shortest distance in the circumferential direction between the first reversal position and a reversal position that is set in the other winding end portion during the time until the traverse direction is reversed at the third reversal position after being reversed at the first reversal position is longer than the shortest distance in the circumferential direction between the first reversal position and the third reversal position.

7. A method of manufacturing a filtering member including a cylindrical body formed by winding a wire, the method comprising: forming a pattern layer of a mesh form on an outer circumferential surface of a shaft member by winding the wire on the outer circumferential surface of the shaft member and laminating the pattern layers in plural numbers in a radial direction of the shaft member, wherein a start end of the wire is fixed in one winding end portion of the shaft member, and the shaft member is rotated in one direction, whereby the wire is wound on an outer circumferential surface of the shaft member while the wire is traversed from one winding end portion toward an other winding end portion, and the traverse direction of the wire is reversed when the wire arrives at the other winding end portion of the shaft member, thereby forming a pattern layer of a mesh form by successively winding the wire on the outer circumferential surface of the shall member, and the wire is wound so that a shortest distance in a circumferential direction between a first reversal position of the plurality of reversal positions and a second reversal position at which the traverse direction is reversed immediately after being reversed at the first reversal position is longer than a shortest distance in a circumferential direction between the first reversal position and a third reversal position located nearest to the first reversal position.

* * * * *